Aug. 11, 1942.   L. F. THIRY   2,292,675
RUBBER BALL AND SOCKET JOINT
Filed March 17, 1941   2 Sheets-Sheet 1
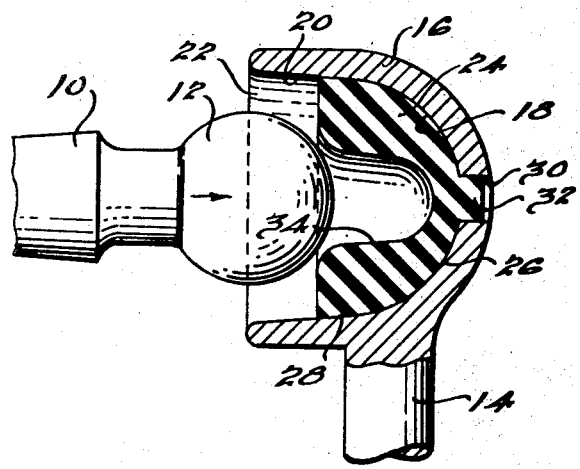
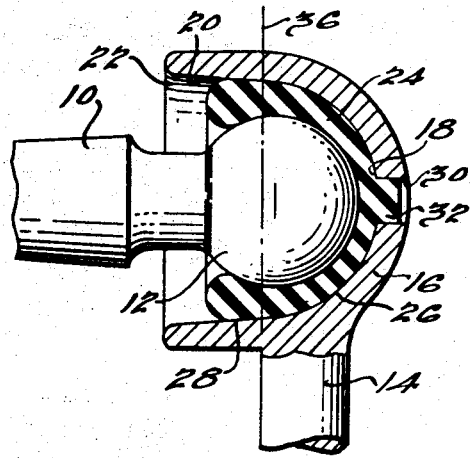
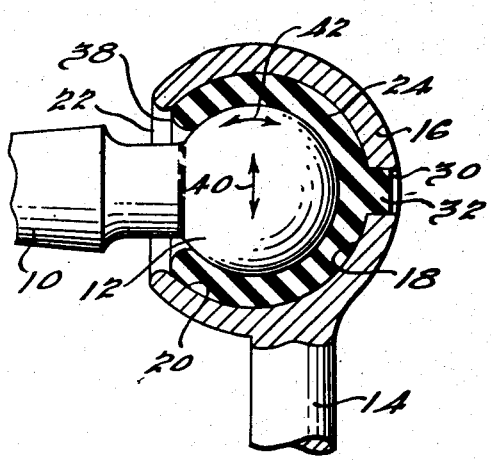
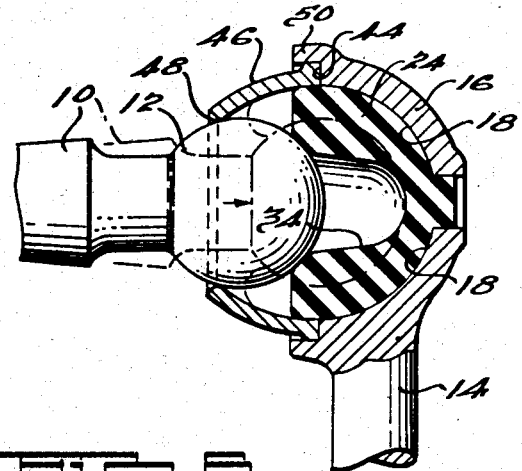
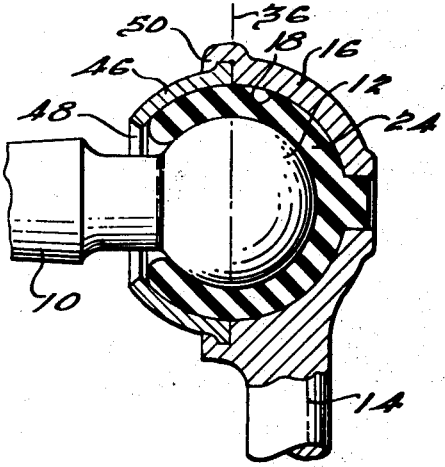
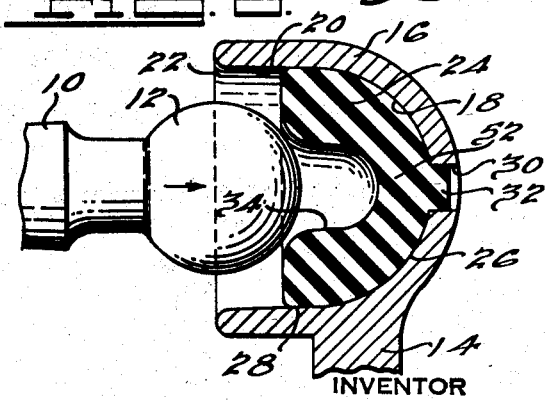
INVENTOR
Leon F. Thiry
BY
Harness, Dickey & Pierce.
ATTORNEYS.

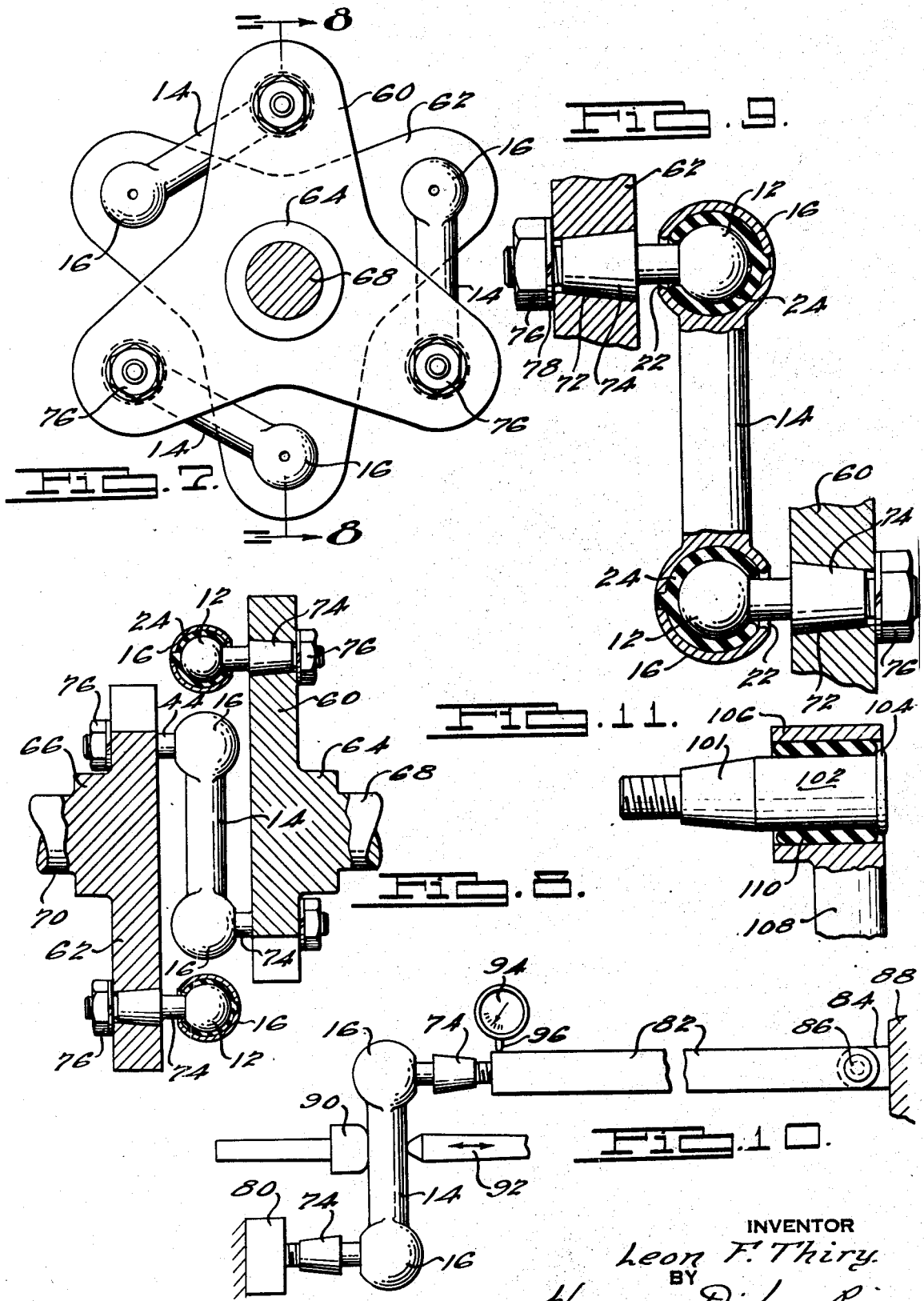

Patented Aug. 11, 1942

2,292,675

UNITED STATES PATENT OFFICE 2,292,675

RUBBER BALL AND SOCKET JOINT

Leon F. Thiry, Montclair, N. J.

Application March 17, 1941, Serial No. 383,699

4 Claims. (Cl. 287—85)

The present invention relates to joints, and particularly to improvements in ball and socket type and to the method of making such joints.

One of the primary objects of the present invention is to provide improvements in ball and socket joints in which a flexible or elastic insert, preferably of a flexible or elastic rubber, is disposed between the ball and the socket casing and in which all relative movements between the ball and the socket are taken by the flexing or elastic properties of the rubber insert, rather than by an abrasive wiping action which would ultimately cause failure.

Another object of the invention is to provide improvements in the type of joint mentioned in which the deformable rubber insert has such a predetermined initial shape that when assembled it is deformed sufficiently in the proper places so that all of the relative movements between the ball and the socket are taken by the flexing properties of the insert.

Another object of the invention is to provide an improved method of forming joints of the type mentioned in which the parts are so assembled that the rubber insert is properly located and sufficiently deformed to give the proper flexing properties in the assembled article.

Another object of the present invention is to provide improvements in universal joint constructions, such as those used in automobile drive shaft assemblies.

Another object of the present invention is to provide a novel method of accurately forming an assembled link element, which includes a rubber member, used in a universal joint construction so as to compensate for the tolerance in the formation of the rubber and metal members.

Other objects of the invention will become apparent from the following specification, the drawings relating thereto, and from the claims hereinafter set forth.

In the drawings, in which like numerals are used to designate like parts in the several views throughout:

Figure 1 is a side elevational view with parts in cross-section showing the elements of the joint before assembly;

Fig. 2 is a view similar to Fig. 1, showing the parts in an intermediate stage of assembly;

Fig. 3 is a similar view showing the parts assembled in the final article;

Fig. 4 is a view similar to Fig. 1 showing a modified form of the present invention;

Fig. 5 is a view similar to Fig. 3 showing the joint of Fig. 4 in its final form;

Fig. 6 is a view similar to Fig. 1 showing another modified form of the present invention;

Fig. 7 is an elevational view of a universal joint construction embodying features of the present invention;

Fig. 8 is a cross-sectional view taken substantially along the line 8—8 of Fig. 7;

Fig. 9 is an enlarged cross-sectional view, with parts in elevation, of one of the links in Figs. 7 and 8, showing such link in its association with the plate members;

Fig. 10 is a diagrammatic view illustrating a novel method of accurately forming the links to the proper length; and, Fig. 11 is a partial view of another form of link assembly which may be employed with the structure of Fig. 7.

The joint of the present invention is particularly useful in the automotive field, particularly in the construction of joints used in shock absorbers, sway elimination linkages, steering connections, tie rods, or the like. It is, however, to be understood that such joints also have other uses, as will be appreciated by those skilled in the art.

Referring to the drawing, and particularly to Figs. 1 to 3 thereof, in which one embodiment of applicant's invention is illustrated, a joint is shown which comprises a rigid link member 10 having a ball head 12 integrally formed thereon. Another link member 14 is disposed at an angle with respect to the member 10 and has a socket 16 formed at one end thereof or otherwise attached. In its initial form, such socket is formed with a semi-spherical portion 18 terminating in a substantially straight annular portion 20 having a window 22 formed therein. In the embodiment illustrated, the member 10 is shown at substantially a right angle with respect to the member 14 with the axis of the socket substantially aligned with the axis of the member 10 and at substantially a right angle to the axis of the member 14. It is to be understood, however, that such members may be disposed at different angles, or may be in alignment, from that shown and that the axis of the socket may also be changed, depending upon the requirements of particular applications of the present invention. Such changes in angular relationship are considered to be detail features of design requirements.

The member 10 is adapted to be positioned with respect to the link 14 so that the ball head 12 is received within the socket 16 in spaced relation to the walls thereof. A flexible or elastic insert 24 of rubber is positioned within such space. In its free state, the insert 24 is cup-shaped and is preferably formed with a generally semi-spherical outer surface 26 terminating adjacent the lip in a substantially straight portion 28, so that such cup is generally complementary to the shape of the socket.

An opening 30 is preferably provided through the bottom of the socket; and a projection 32 of complementary shape is formed on the outside surface of the insert 24, at the bottom thereof. Such projection 32 is adapted to be received within the aperture 30 for the purpose of centering and properly positioning the insert 24 with respect to the socket. If desired, the inner corner of the aperture 30 may be tapered and the outer corner of the projection 32 may also be tapered so as to assist in positioning the insert.

The radial thickness of the insert 24 in its free state is predetermined with respect to the space between the ball head and the socket so that such radial thickness is greater adjacent the lip and sides of the insert than at the bottom thereof, and is greater than the radial dimensions of the assembled space.

In the embodiment illustrated, the elements are assembled by placing the insert 24 in the socket as shown in Fig. 1. The adjacent surfaces of the ball head, the insert and the socket are preferably lubricated with material such as soapy water or vaseline which will disappear between the surfaces in contact after a short time. The ball head 12 is then forced into the recess 34 of the cup-shaped insert to the approximate position shown in Fig. 2. In so doing, a high speed assembly should be followed so that the head strikes the recess at a high speed, in order to facilitate the flow of the rubber. It is preferable that the force be a percussion force which may be applied to the ball head while holding the socket stationary, or be applied to the socket while holding the ball head stationary. In so forcing the ball head 12 into the recess, the center of the ball may be forced slightly beyond the normal center line 36 of the socket, or to such center line, so that the insert 24 is deformed in the following manner. In forcing the insert into the space between the ball head 12 and the socket, the insert 24 is compressed radially so that the element 24 expands or elongates around the surface of the ball toward the base thereof and toward the window 22.

The article is then completed by spinning the annular portion 20 of the socket from the shape shown in Fig. 2 to that shown in Fig. 3. In so spinning the annular portion, the compressive force is preferably applied progressively outwardly toward the window from a position substantially at the center line 36. In this way, the insert 24 is further expanded or elongated by radial compression so that the insert moves further around the surface of the ball toward the base thereof and toward the window 22. It is preferable that the insert 24 be so elongated that the lip 38 of the insert lies as close to the edge of the window 22 as possible. Also, the area of contact between the inner surface of the insert and the outer surface of the ball is at a maximum so that the greatest grip therebetween is obtained.

The elongation of the insert 24 around the ball head is greatest adjacent the lip 38 of the insert or adjacent the window 22 of the socket, and then diminishes toward the base of the insert or socket. The variation in elongation thus compensates for the loss of area due to the window. For example, the elongation adjacent the lip may be 120%, while at the base of the cup or socket may be merely 5%. Thus, when the members 10 and 14 are tilted or twisted with respect to each other, the inner surface of the insert may flex with respect to the outer surface within its limits of flexibility without having any slippage between the ball head and the insert or the insert and the socket. When the member 10 is twisted about its longitudinal axis so that the surface of the ball head moves in the directions of the arrows 40, the flexing characteristic of the deformed insert takes the relative movements between the ball and the socket without slippage between the contacting surfaces of the insert therewith. When the longitudinal axis of the member 10 is tilted with respect to the axis of the member 14, the surface of the ball head follows a path indicated by the arrows 42 and the flexible characteristics, or the axial elongation, of the element 24 around the ball head will permit flexing of the rubber insert so that there is no slippage between the ball head and the insert or between the insert and the socket.

The window 22 may be given the desired shape, depending upon the relative movements between the members 10 and 14 in the particular application of applicant's invention. It is desirable that the window 22 be as small as possible and be of such a shape that the edges defining such window may extend as closely as possible to the adjacent portions of the member 10 without interfering with the movement thereof. It will be appreciated that the extreme, relative angular positions of the members 10 and 14 may be readily determined and that the window edge may be given a shape complementary in size. It will be further appreciated that such window may have any one of a number of different shapes, such as round, oval, or irregular, depending upon the particular application and design of the joint of the present invention.

In the method of assembly described above, the insert 24 is placed into the socket and thereafter the ball head 12 is forced into the recess 34 of the insert. It is to be understood that it is also within the contemplation of the present invention that the insert 24 could be forced over the ball head 12 and thereafter the insert, together with the ball head, forced into the socket to the position shown in Fig. 2.

An important feature of the use of a cup-shaped rubber insert is that an insert of that form will be positively located at the desired point and cannot slip or move as a whole on the ball toward the stem end thereof.

In Figs. 4 and 5, a modified form of the present invention is illustrated in which the integral portion 20 of the socket 16 is dispensed with so that such socket retains the semi-spherical portion only. The annular edge of the socket is formed with an offset flange 50 forming an inner annular shoulder 44 for the reception of the inner annular edge of a cup-shaped member 46. Such member 46 is provided with a window 48 and is adapted to be initially positioned as shown in Fig. 4. The flange 50 may then be pressed inwardly around the outer annular edge of the member 46 for securing it with respect to the semi-spherical portion 18 and for completing the socket. The parts are assembled by forcing the ball head into the recess 34, from the position shown in full lines to that shown in broken lines in Fig. 4, and in a manner described above in connection with Fig. 2 so that the insert 24 is distorted in the manner of the embodiment above described. In the assembly it is important that the member 46 be firmly held against the socket 16 during deformation of the insert. Thereafter, the member 46 may be spun, or otherwise deformed, radially inwardly to the position shown in Fig. 5 preferably so that the insert 24 is further radially compressed and axially expanded around the surface of the ball head 12. The center of the ball head 12 then returns so that it is substantially co-incident with the plane of the center line 36, as it does in the embodiment described above. The action of the joint is similar to that described above.

Fig. 6 illustrates a modified form of the structure shown in Fig. 1 in that the bottom of the cup-shaped insert 24, as indicated at 52, is of greater radial thickness than in the insert described above. When the parts are assembled there will, therefore, be greater radial compression in this region at the bottom of element 24 so that there will also be a correspondingly greater elongation or expansion around the end of the ball. The insert at this point will, therefore, have greater flexibility in the bottom region than in the embodiment described above.

In the embodiment described above, the general shape of the outer contour of the insert is semi-spherical. However, it may be understood that where a greater movement in one direction is required than in another, it would be expedient to give the insert other shapes, such as elliptical in transverse section. Such variations in shape are considered to be within the scope of the present invention. It will also be understood that the term "rubber" as used herein includes both natural and synthetic, or artificial, rubber and other materials having the physical properties of deformable natural rubber.

Referring to Figs. 7 to 9, the joint of the present invention is illustrated in a novel universal joint construction or coupling. Such universal joint is particularly adapted to be used in the drive shaft assembly of an automobile. The joint comprises a pair of plate members 60 and 62 which, in the embodiment illustrated, are generally in the form of a hub portion having three or more arms extending radially therefrom at equally spaced points therearound. The hub portions of the plates 60 and 62 are indicated at 64 and 66, respectively, and have shafts 68 and 70, respectively, suitably connected thereto or integrally formed therewith. Such shafts 68 and 70 must be accurately aligned so that there is no whip in the shaft assembly upon rotation thereof. The relative size of the shafts and plates may, of course, be varied to meet particular dimensions and when used in automobiles, it is quite likely that the shafts would be of a greater size, as compared with the size of the plates, than that illustrated in the drawings.

Each of the plate members 60 and 62 is provided with an opening 72 in each of the arms thereof. The axes of all of such openings are disposed at an equal and accurate distance from the center of the shafts 68 and 70. The plate members 60 and 62 are adapted to be positioned with respect to each other so that the respective arms thereof are alternately disposed therearound as clearly shown in Fig. 7.

The adjacent arms of the plates 60 and 62 are adapted to be connected together by a link 14 which corresponds to the link above-described. The link 14 has a socket 16 formed at each end thereof and is of the construction described above in connection with Figs. 1 through 3. The sockets are so formed on the link 14 that the windows 22 thereof face in opposite directions, as best shown in Fig. 9. A stud 74, having a ball head 12 mounted thereon, is preferably formed with a tapered portion which is received within one of the tapered openings 72 and is secured thereto by means of a nut 76 and lock washer 78. The stud 74 corresponds to the member 10 above described and the ball head 12 is received within the socket 16 in the same relation with respect to the rubber insert 24 as in the embodiments above described. One of the studs 74 is connected to one of the arms of plate 62 and the other stud 74 of that particular link extends in the opposite direction and is connected to one of the adjacent arms of the plate 60. Similar links 14 connect the other arms of the plate member 60 with the corresponding adjacent arms of the plate member 62 around the joint.

The action of the insert 24 in each of the sockets is such as that described above so that it will be appreciated that any relative movement between the ball head and the socket is taken through the flexing characteristics of the rubber insert.

Also, in order that there be no whip in the drive shafts, the link assemblies, including the studs 74, the link 14 and the rubber element 24, are very accurately formed. The accurate formation of such assemblies may be accomplished by the method diagrammatically illustrated in Fig. 10. Such method comprises fixing one of the studs 74 in a fixed block 80 and threadably receiving the other stud 74 in the end of an elongated member 82. The opposite end of such member 82 is pivotally connected to a bracket 84, by means of a pivot pin 86, which is fixedly secured to a suitably fixed member 88. The link 14 is preferably initially formed of a length slightly less than the desired accurate length and such link 14 is disposed at a right angle with respect to the axis of the lower stud 74. A fixed stop member 90 is positioned to engage one side of the link 14 and a hammer 92 then strikes the opposite side so as to elongate the link 14. Such link will, therefore, be elongated in relatively small increments and an indicator gauge 94, having an actuating finger 96 is disposed above the arm 82 as close to the longitudinal axis of the link 14 as possible. As the forward end of the arm 82 is moved upwardly, due to the elongation of the link 14, such forward corner of the arm strikes the actuating finger 96 and indicates on the indicator 94 the extent of elongation.

Although the gauge 94 is not positioned directly on the link 14, it may be calibrated so that it accurately indicates the exact elongation of the link. The gauge 94 may be so positioned that when a particular reading is indicated thereon, the link is then at the proper accurate length.

In this manner, all of the assemblies may be formed of the same accurate length so that when they are positioned on the plates 60 and 62, as described above, the distance between the centerlines of the studs 74 is accurate and compensates for tolerances in the manufacture of the rubber inserts 24, a universal action is permitted through the ball and socket construction, but there will be no whip in the drive shaft.

The hammer action can be replaced by pressing progressive hydraulic or other type of pressure elongating the link in the same manner as the hammer. Also, the link can be shortened by end pressure, reducing its initial length.

In Fig. 11, another form of link assembly is illustrated which generally corresponds to the link assembly shown in Figs. 7 to 9. Such link assembly includes a stud 101 corresponding to the stud 74 above described and having a cylindrical end 102 in place of the ball head 12. The end of the portion 102 may be upset to provide an annular flange 104. The end portion 102 is adapted to be positioned within a cylindrical eye 106 of a link 108, corresponding to the link 14 above described in connection with the structure of Figs. 7 to 9. A cylindrical rubber insert 110 is forced into the space between the stud portion 102 and the eye 106, and such insert is initially of a size greater than such space with an internal diameter less than the diameter of the portion 102 and an external diameter greater than the internal diameter of the eye 106. Thus, when the insert is forced into the smaller space, it is compressed radially and expanded axially so that it has flexing properties in the assembly which permit relative movement between the stud 101 and link 108.

What is claimed is:

1. A joint formed of a member having a socket formed therein and a second member having a ball head positioned within said socket and spaced from the walls of said socket, a cup-shaped deformable rubber element disposed within the space between the ball head and said socket, said element in its free state being of substantially greater thickness than the space between said ball head and socket and having an interior area substantially less than the area of said ball head enveloped by said element in the assembled joint, so that when said joint is assembled the element is substantially reduced in thickness and caused to envelop an area on the surface of the ball head which is substantially greater than the interior area of said element in its free state.

2. A joint formed of a member having a socket formed therein and a second member having a ball head positioned within said socket and spaced from the walls of said socket, a cup-shaped deformable rubber element disposed within the space between the ball head and said socket, said element in its free state being of substantially greater thickness than the space between said ball head and socket and having an interior area substantially less than the area of said ball head enveloped by said element in the assembled joint and the difference between the thickness of the element in its free state and the thickness of said space being greater adjacent the lip of said cup-shaped element than at the bottom of said element, so that when said joint is assembled the element is substantially reduced in thickness and caused to envelop an area on the surface of the ball head which is substantially greater than the interior area of said element in its free state.

3. A joint formed of a member having a socket, a second member having a stem projecting into said socket and provided with a ball head located within the socket in spaced relation to the walls of the socket, the socket opening being of insufficient size to permit passage of the ball head but the edges of said opening being normally free of contact with said stem, and a cup-shaped deformable rubber element disposed within the space between said ball head and socket and enveloping more than a complete hemisphere of the surface of the ball head, said element in its free state being of substantially greater thickness than the space between said ball head and socket and having an interior area substantially less than the area of said ball head enveloped by said element in the assembled joint, so that when said joint is assembled the element is substantially reduced in thickness and caused to envelop an area on the surface of the ball head which is substantially greater than the interior area of said element in its free state.

4. A joint formed of a member having a socket, a second member having a stem projecting into said socket and provided with a ball head located within the socket in spaced relation to the walls of the socket, the socket opening being of insufficient size to permit passage of the ball head but the edges of said opening being normally free of contact with said stem, and a cup-shaped deformable rubber element disposed within the space between said ball head and socket and enveloping more than a complete hemisphere of the surface of the ball head, said element in its free state being of substantially greater thickness than the space between said ball head and socket and having an interior area substantially less than the area of said ball head enveloped by said element in the assembled joint and the difference between the thickness of the element in its free state and the thickness of said space being greater adjacent the lip of said cup-shaped element than at the bottom of said element, so that when said joint is assembled the element is substantially reduced in thickness and caused to envelop an area on the surface of the ball head which is substantially greater than the interior area of said element in its free state.

LEON F. THIRY.